United States Patent
Iwasaki

(10) Patent No.: US 7,571,381 B2
(45) Date of Patent: Aug. 4, 2009

(54) LAYOUT METHOD, PROGRAM, AND DEVICE

(75) Inventor: Shingo Iwasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 11/286,781

(22) Filed: Nov. 23, 2005

(65) Prior Publication Data

US 2006/0112330 A1 May 25, 2006

(30) Foreign Application Priority Data

Nov. 25, 2004 (JP) ............................. 2004-340805

(51) Int. Cl.
G06F 17/00 (2006.01)
(52) U.S. Cl. ..................... 715/244; 715/253
(58) Field of Classification Search ................. 715/243, 715/244, 245, 246, 247, 253, 273
See application file for complete search history.

(56) References Cited

U.S. PATENT DOCUMENTS

| | | | |
|---|---|---|---|
| 5,224,181 A | 6/1993 | Tsutsumi | |
| 5,745,910 A * | 4/1998 | Piersol et al. | 715/210 |
| 5,812,862 A * | 9/1998 | Smith et al. | 715/209 |
| 6,144,974 A * | 11/2000 | Gartland | 715/205 |
| 6,934,052 B2 | 8/2005 | Venable | |
| 7,395,510 B2 * | 7/2008 | Diwan et al. | 715/801 |
| 2002/0051208 A1 | 5/2002 | Venable | |
| 2002/0095439 A1 | 7/2002 | Long et al. | |
| 2003/0086619 A1 | 5/2003 | Nagaishi | |
| 2004/0003350 A1 * | 1/2004 | Simmons et al. | 715/517 |
| 2004/0014013 A1 * | 1/2004 | Diesel et al. | 434/118 |
| 2004/0163047 A1 * | 8/2004 | Nagahara et al. | 715/517 |
| 2004/0210833 A1 * | 10/2004 | Lerner et al. | 715/512 |
| 2004/0255245 A1 | 12/2004 | Yamada et al. | |

FOREIGN PATENT DOCUMENTS

| | | |
|---|---|---|
| CN | 11-282834 A | 10/1999 |
| JP | 10-340330 A | 12/1998 |
| JP | 11-250272 A | 9/1999 |
| JP | 2002-042148 A | 2/2002 |
| JP | 2004-303197 A | 10/2004 |

* cited by examiner

Primary Examiner—Laurie Ries
(74) Attorney, Agent, or Firm—Canon U.S.A., Inc., IP Division

(57) ABSTRACT

A layout system for laying out a plurality of contents disposes the plurality of contents in a layout area, moves the plurality of contents in accordance with an overlapping of the disposed plurality of contents, and moves the plurality of contents again in accordance with weight information allocated to the layout area.

9 Claims, 16 Drawing Sheets

FIG. 2

```
<?xml version="1.0" encoding="UTF-8"?>
<layout>
 <objectlist>
  <object number="1">
   <block>
    <width>128</width>
    <height>64</height>
   </block>
   <data>
    <text xml:space="preserve">aaaaa</text>
    <image src="photA.jpg"></image>
   </data>
  </object>
  <object number="2">
   <block>
    <width>256</width>
    <height>64</height>
   </block>
   <data>
    <text xml:space="preserve">bbbbb</text>
    <image src="photB.jpg"></image>
   </data>
  </object>
  <object number="3">
   <block>
    <width>64</width>
    <height>512</height>
   </block>
   <data>
    <text xml:space="preserve">ccccc</text>
    <image src="photB.jpg"></image>
   </data>
  </object>
  •
  •
 </objectlist>
</layout>
```

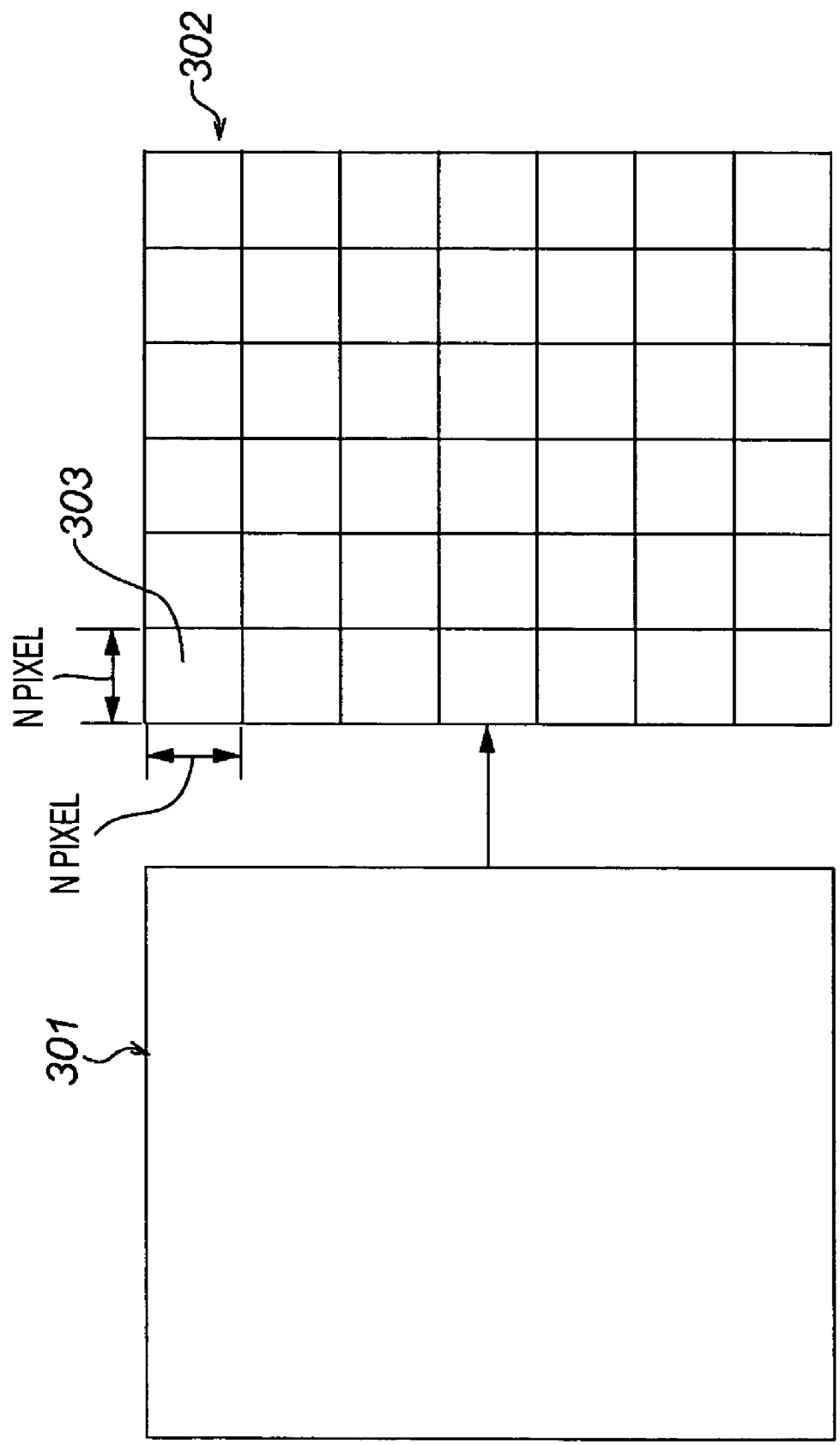

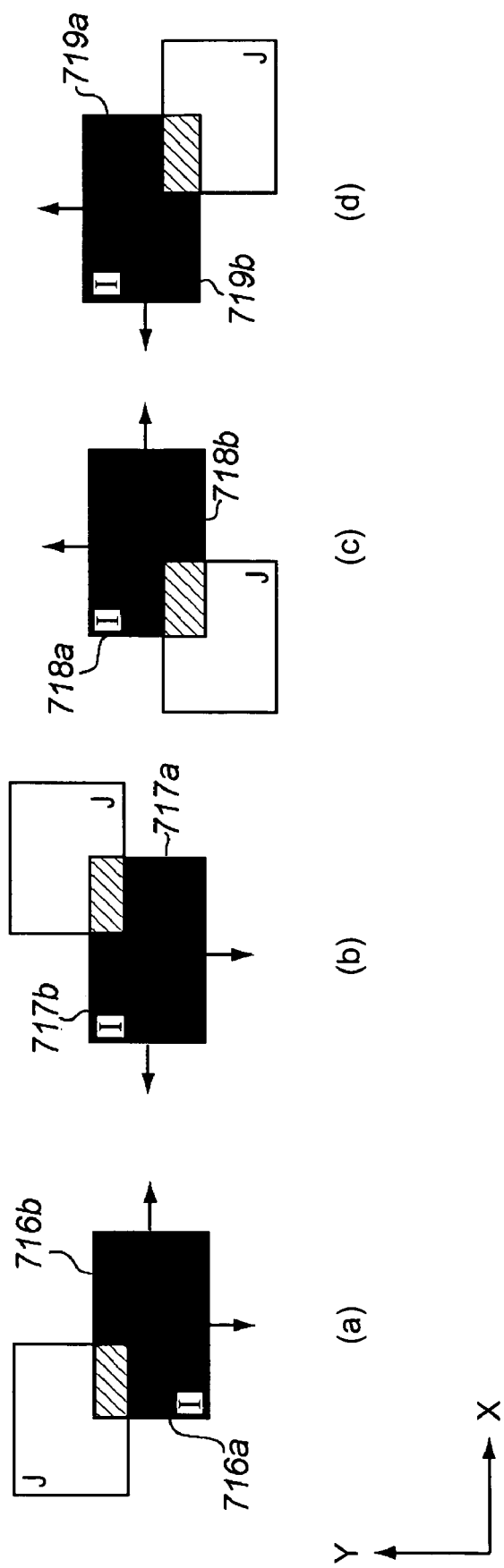

FIG. 10

LAYOUT METHOD, PROGRAM, AND DEVICE

BACKGROUND OF THE INVENTION

1. Field of the Invention

The present invention relates to the technology of laying out contents including text and images.

2. Description of the Related Art

When contents including, for example, text and images in a document are laid out in a certain area, the following operations have been carried out (refer to, for example, U.S. Pat. No. 5,224,181). For example, a composition application has been used to determine the locations of placement of individual contents by manual operations carried out by a human being. Alternatively, a template which can be used to output the contents in a fixed layout format has been manually prepared in order to lay out the contents.

Technologies for determining the merits and demerits of a method of laying out contents relying on human intuition or manual operation are also available (refer to, for example, US Patent Laid-Open No. 2003/0086619).

However, when the contents in a document are laid out manually without any layout information which specifies how the contents in the document are to be laid out, the workload due to trial and error is increased, thereby causing human resources costs to become extremely high.

Even when a template which can be used to output contents data in a fixed layout format is prepared and used to lay out and output an image or a text, the image or text can only be output in certain types of fixed patterns. Therefore, a layout result in accordance with, for example, the types and sizes of various contents data that are input cannot be flexibly obtained.

SUMMARY OF THE INVENTION

The present invention makes it possible to dispose contents of a document (a page) in accordance with their sizes within the document.

In an aspect of an exemplary embodiment of the present invention, a method of laying out a plurality of contents includes a disposing step of disposing the plurality of contents in a layout area, a first moving step of moving the plurality of contents that have been disposed by the disposing step, in accordance with overlapping of the plurality of contents, and a second moving step of moving the plurality of contents that have been moved by the first moving step, in accordance with weight information allocated to the layout area.

Further features of the present invention will become apparent from the following description of exemplary embodiments with reference to the attached drawings.

BRIEF DESCRIPTION OF THE DRAWINGS

FIG. 2 illustrates rectangular information including items of information of which are found in a plurality of rectangular areas.

FIG. 3 shows a state in which a layout area is provided with grids.

FIG. 7C illustrates yet another exemplary pattern of movement in accordance with the degree of overlap of the rectangular areas.

FIG. 10 schematically illustrates how an exemplary layout is carried out by combining the weight template indicating the directionality of the layout and a simulated annealing method.

DESCRIPTION OF THE EMBODIMENTS

Embodiments of the present invention will hereunder be described with reference to the drawings.

First Exemplary Embodiment

Figure 1A:
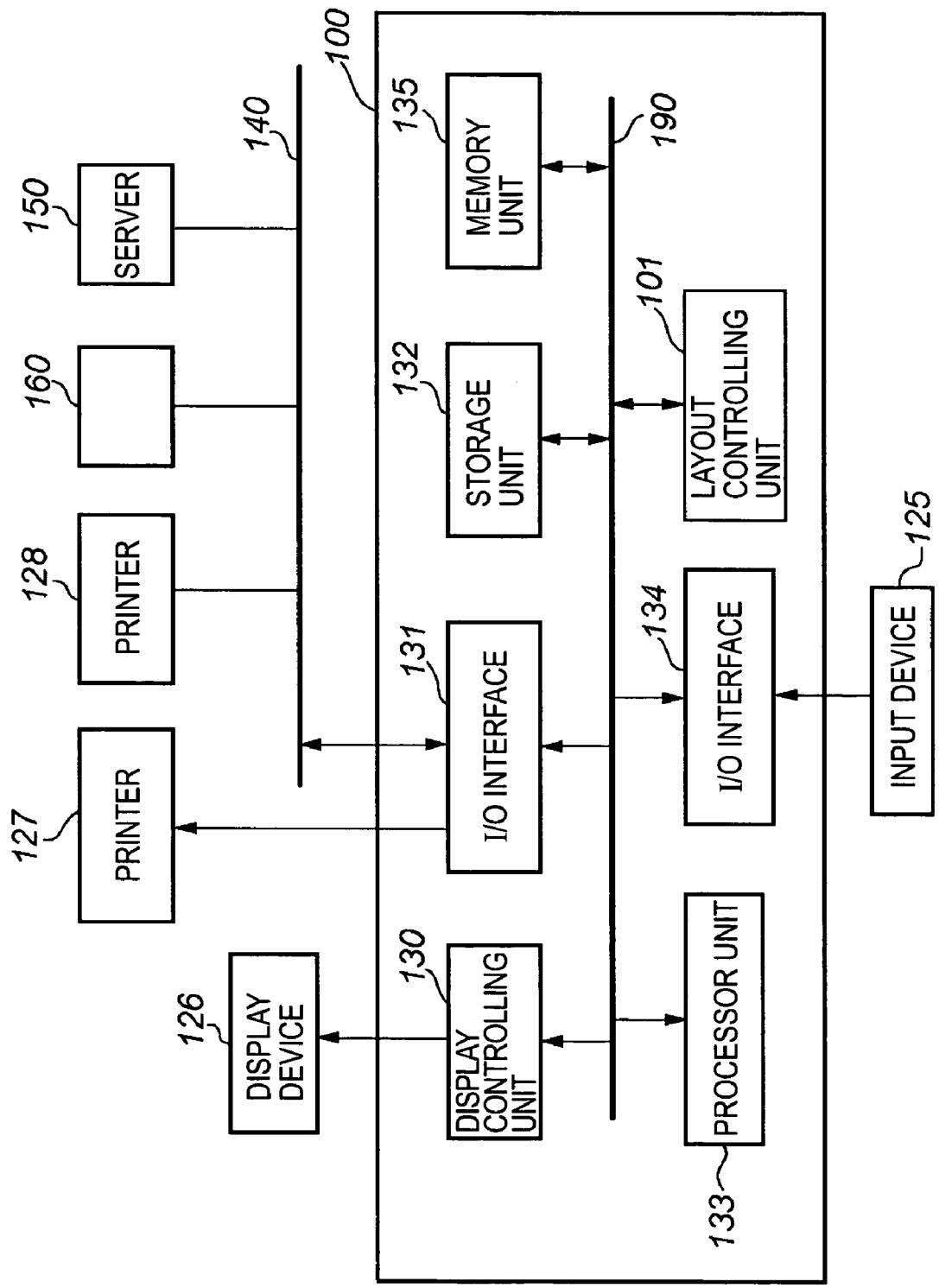
FIG. 1A is a block diagram schematically showing an exemplary architecture of a host computer serving as a layout controlling device, according to an embodiment of the present invention.

FIG. 1A is a block diagram schematically showing an exemplary architecture of a host computer serving as a layout controlling device 100. The layout controlling device 100 can control the positions of contents data to be laid out on a page in accordance with the sizes of rectangular areas including the contents data.

The contents data regarding, for example, a text and an image are laid out with a layout controlling unit 101 under control of a processor unit 133. A layout control process (shown in FIG. 6) regarding the contents data is executed with software stored in a storage unit 132 in the layout controlling device 100.

The storage unit 132 which stores this software is a computer readable medium such as a hard disc, DVD or the like. Under the control of the processor unit 133 or the layout controlling unit 101, the software is loaded to a processing area in the layout controlling device 100 from the computer readable medium and is executed. Such a computer program which is in the software or which is recorded on a medium or a computer readable medium which stores such a program specifies a computer function so as to serve as an executing unit configured to execute information processing regarding contents data layout control in cooperation with the computer, editing, and display control or computation required for variable data printing.

The layout controlling device 100 is connected to an input device 125 such as a keyboard or a pointing device including a mouse, a display device 126, and printers 127 and 128. When an operator executes the information processing regarding, for example, the layout control, the operator can carry out various input, display, and output settings.

An input/output (I/O) interface 131 connects the layout controlling device 100 to a network 140, so that the layout controlling device 100 can be connected to another computer (such as a database server 150). The network 140 is typified by a local area network (LAN), a wide area network (WAN), the Internet or the like.

The layout controlling device 100 can communicate with another computer (such as the database server 150) through the network 140, and can receive data required for the layout control. This data is not necessarily limited to that stored in a device outside the layout controlling device 100. Accordingly, the data may be stored in the storage unit 132 in the layout controlling device 100, and can be referred to when executing the layout control.

The layout controlling device 100 can distribute layout control results produced by the layout control carried out with the layout controlling unit 101 to an information processor 160 (e.g., a personal computer) or the printer 128 through the network 140. The layout control results can be output to the connectable printer 127 through the input-output (I/O) interface 131.

The layout controlling device 100 further comprises a memory unit 135 (including a random access memory (RAM) or a read-only memory (ROM)), a display controlling unit 130 (including a video interface), and an input/output (I/O) interface 134 for the keyboard or the mouse. Further, the aforementioned components of the layout controlling device 100 are in communication with each other via a bus 190.

Figure 1B:
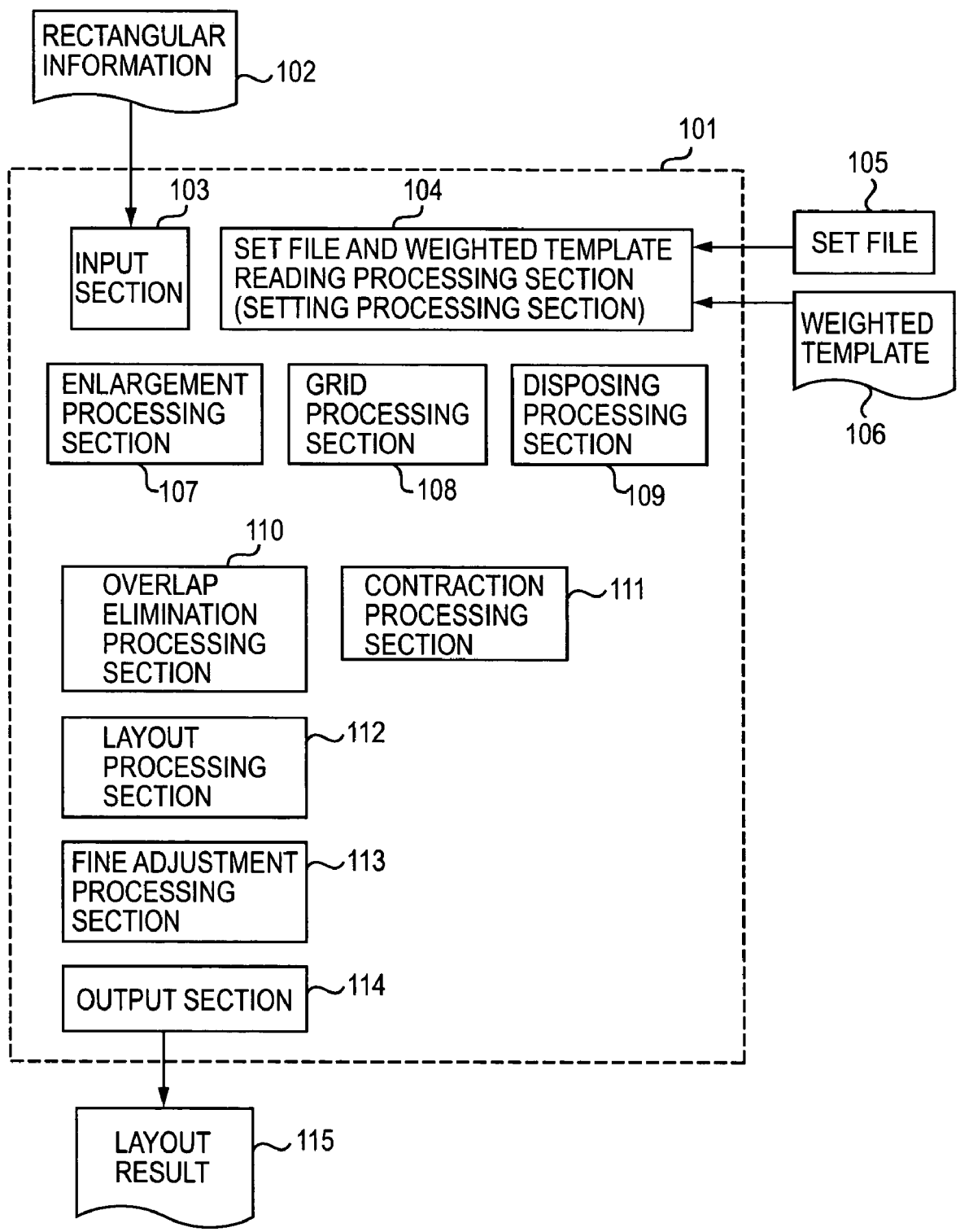
FIG. 1B is a block diagram illustrating in greater detail an exemplary structure of a layout controlling unit.
Figure 1C:
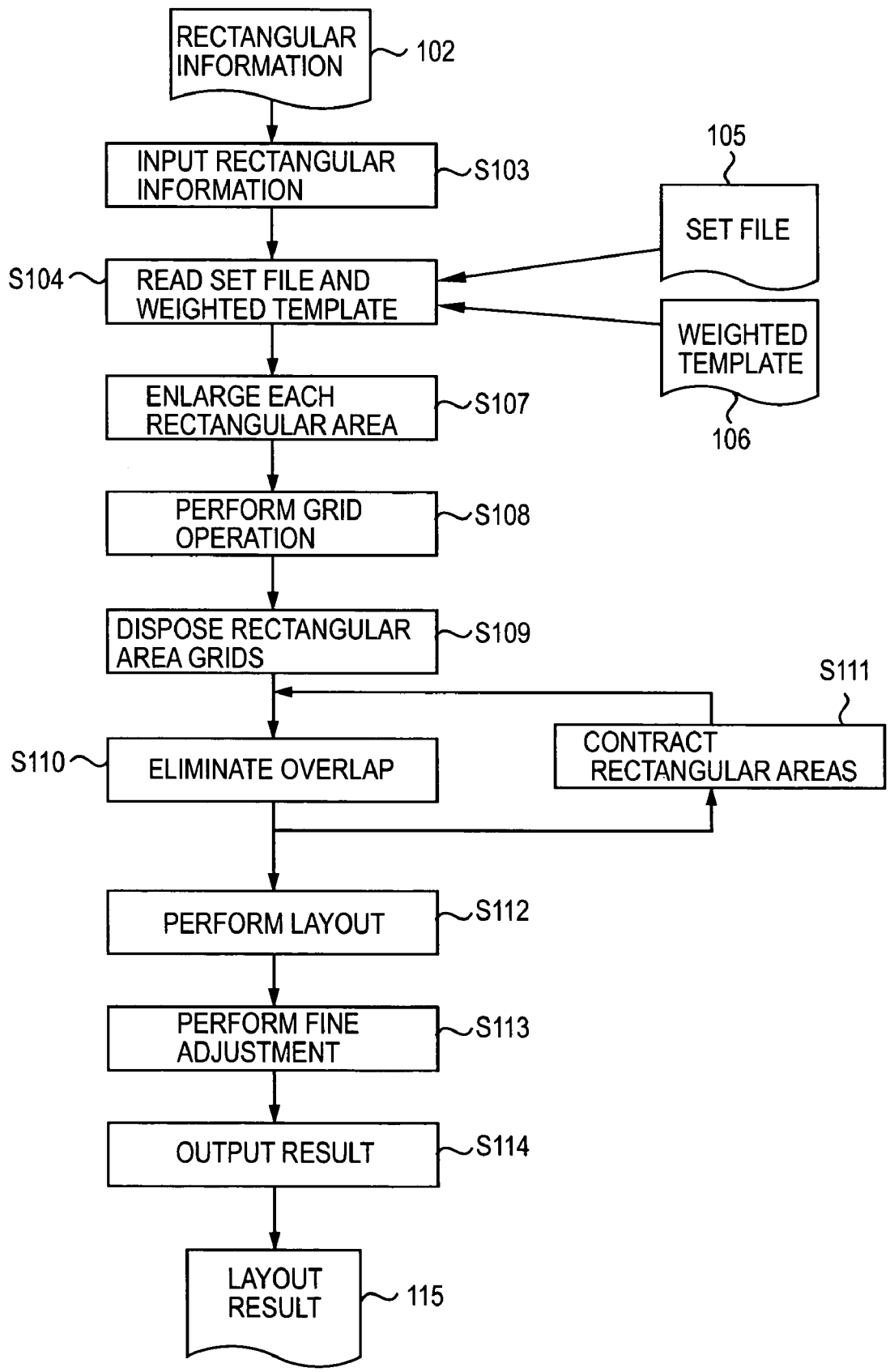
FIG. 1C is a flowchart illustrating exemplary operations carried out by respective structural sections in the layout controlling unit.

FIG. 1B is a block diagram illustrating in detail an exemplary architecture (functional blocks) of the layout controlling unit 101 (shown in FIG. 1A); while FIG. 1C is a flowchart illustrating exemplary operations carried out by the respective structural sections.

In FIG. 1B, reference numeral 102 denotes information (rectangular information) including a plurality of items of data which are related to, for example, an image and a text, and which are disposed in one rectangular area. In Step S103, the rectangular information 102 is input from an input section 103.

Reference numeral 104 denotes a processing section for reading a set file and a weight template (hereinafter "setting processing section"). In Step S104, the setting processing section 104 reads a set file 105 and a weight template 106 from, for example, the storage unit 132 and executes an initial setting required to control the layout of the rectangular information. The set file 105 includes various items of setting information for controlling the layout, and the weight template 106 indicates the directionality of the layout.

Reference numeral 107 denotes a processing section configured to enlarge each rectangular area included in the rectangular information by the same proportion in Step S107. In an alternative embodiment described later, the enlargement processing section 107 and the enlarging operation (Step S107) are omitted. A grid processing section 108 adjusts the size of each enlarged rectangular area to a size which can be divided by the width of a division area (grid) whose vertical and horizontal rectangle sizes are specified (Step S108).

Reference numeral 109 denotes a disposing processing section configured to randomly dispose the data of the rectangular area defined by grids so that the items of data do not stick out from a layout area having the grids in Step S109.

Reference numeral 110 denotes an overlap elimination processing section which carries out the following operations. The overlap elimination processing section 110 eliminates an overlap of rectangular area data by performing operations where the rectangular area data overlap by a specified number of times in accordance with a certain regularity in Step S110. When the overlap cannot be eliminated even by the specified number of operations, each rectangular area is reduced by the same proportion with a reduction processing section 111 in Step S111. Thereafter, the overlap elimination processing section 110 carries out operations to determine whether or not the overlap can be finally eliminated. Until a limit of a specified number of reductions is exceeded, these operations are repeated. When the overlap is eliminated, a layout processing section 112 carries out a layout control operation by an optimization algorithm method in Step S112. The layout processing section 112 optimally disposes each rectangular area in the layout area in accordance with the content of the weight template indicating the directionality of the layout.

Reference numeral 113 denotes a fine adjustment processing section configured to eliminate gaps between the rectangular areas adjacent to each other (that is, gaps produced by setting the vertical and horizontal sizes of each rectangular area subjected to the grid operation back to the sizes that match the aspect ratio of an original image) in Step S113. In the alternative embodiment described later, the fine adjustment processing section 113 and the fine adjustment operation (Step S113) are omitted.

Reference numeral 114 denotes an output section configured to output a layout result 115 (Step S114) regarding, for example, coordinate information and vertical and horizontal size information to each of the rectangular areas all at once. By the above-described operations, the rectangular areas are automatically laid out.

The layout result 115 outputted from the output section 114 may have positional information of each laid-out rectangular area added to the rectangular information, so that the output section 114 can generate a layout result as output information that is different from the rectangular information.

Figure 12:
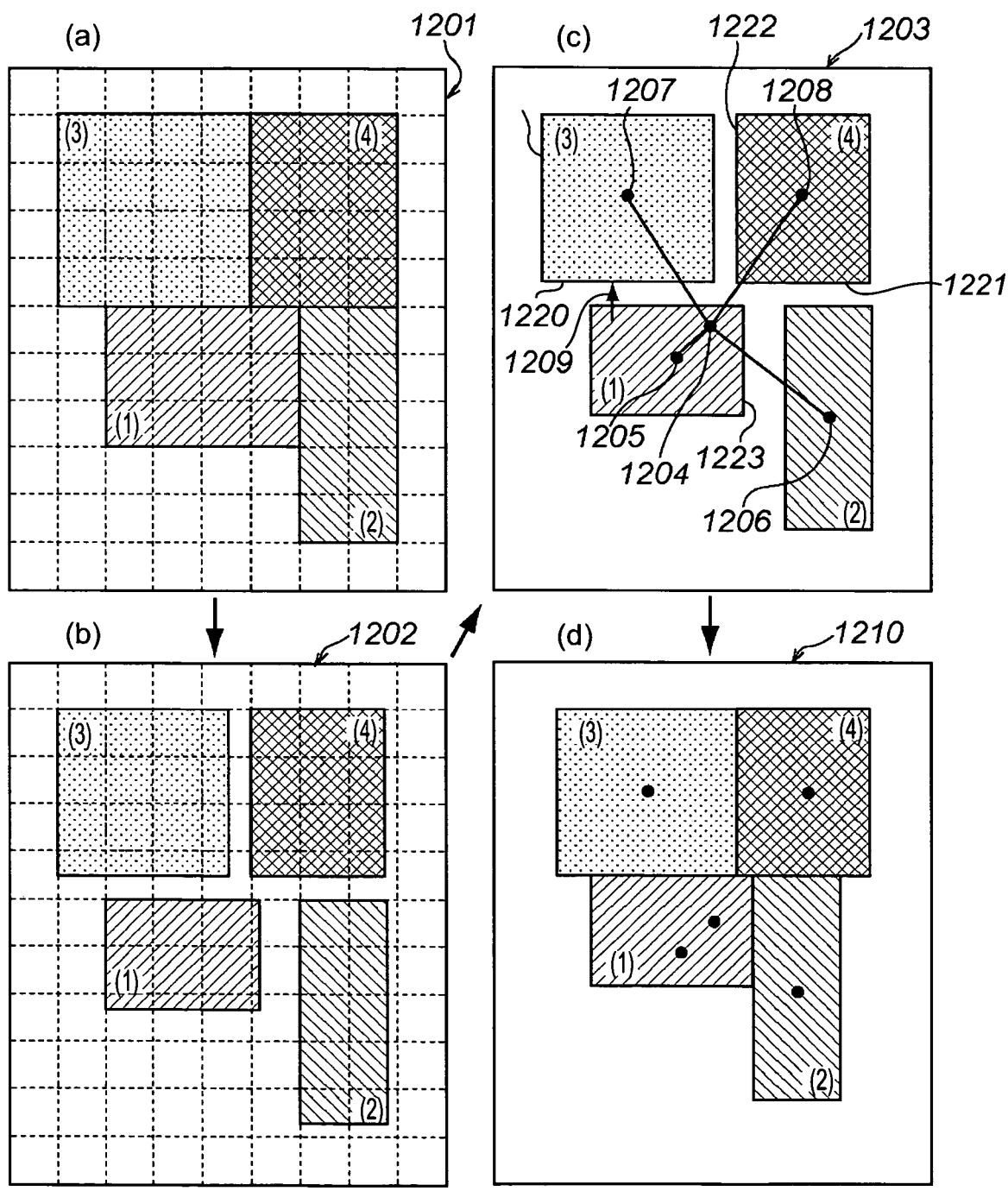
FIG. 12 illustrates exemplary fine adjustment carried out by a fine adjustment processing section.

A finally obtained layout result (such as that shown in state (d) in FIG. 12) can be displayed on the display device 126 under the control of the display controlling unit 130. Moreover, what is displayed on the display device 126 is not limited to the final result. More specifically, it is possible for the display controlling unit 130 to communicate with the layout controlling unit 101 and to cause an intermediate data processing result regarding the layout control to be successively displayed on the display device 126 in order to report the state of progress of the processing to a user.

When an overlap or a gap cannot be eliminated, the overlap elimination processing section 110 in the layout controlling unit 101 causes the display device 126 to notify the user that the data could not be laid out through the display controlling unit 130. By this feature, the user can confirm that the layout of the input rectangular information could not be controlled.

FIG. 2 illustrates rectangular information 201 (corresponding to the rectangular information 102 in each of FIGS. 1B and 1C) including items of information of a plurality of rectangular areas. Here, the rectangular information 201 is shown in the form of XML data serving as a structured text. The rectangular information 201 includes, for example, size information indicating the vertical and horizontal sizes of rectangular areas, text data and image data which describe contents data to be laid out, and connection information for gaining access to the image data.

Reference numeral 202 denotes a block describing information of one rectangular area, and reference numerals 203 and 204 denote the horizontal size and the vertical size of the rectangular area, respectively. Reference numerals 205 and 206 denote items of object data related to the rectangular area (that is, paths (connection information) for linking to the image data and the text data, respectively).

In the embodiment, when the object data which are linked on the basis of the connection information are to be laid out, it may be laid out in connection with the rectangular information, although this is not described in the example in which the object data are used.

Reference numerals 207 and 208 denote blocks describing information of the second and third rectangular areas included in the rectangular information. The input section 103 can identify the rectangular areas to be subjected to a layout control by reading the rectangular information from these XML data formats.

Although, in FIG. 2, the structured document based on the XML data is taken as an example in describing the method of expressing rectangular information, the gist of the present invention is not limited thereto, so that, for example, a structured document based on, for example, HTML or SGML data or a simple text data may be used.

FIG. 3 shows a state in which a layout area is provided with grids. The layout controlling device 100 according to the embodiment assumes that, for example, items of image and text data (contents data) included in a document are disposed in one rectangular area, and initially disposes each rectangular area in a layout area in the document. Then, an overlap of each rectangular area is adjusted to determine an optimal layout, and each rectangular area is moved and disposed.

In moving each rectangular area, when the unit of movement is, for example, one pixel, a considerable amount of time may be required to move each rectangular area to its destination depending upon the size of the layout area. Therefore, a layout area 301 specified by the set file 105 is divided by grids disposed at an apparently fixed width as indicated by reference numeral 302. A unit of one grid square 303 is, for example, N pixel(s) (N is a positive integer). With the unit of the grid square being N pixel(s), while moving each rectangular area, a layout processing is carried out in order to reduce the time of movement of each rectangular area. This makes it possible to reduce the entire processing time.

Figure 4:
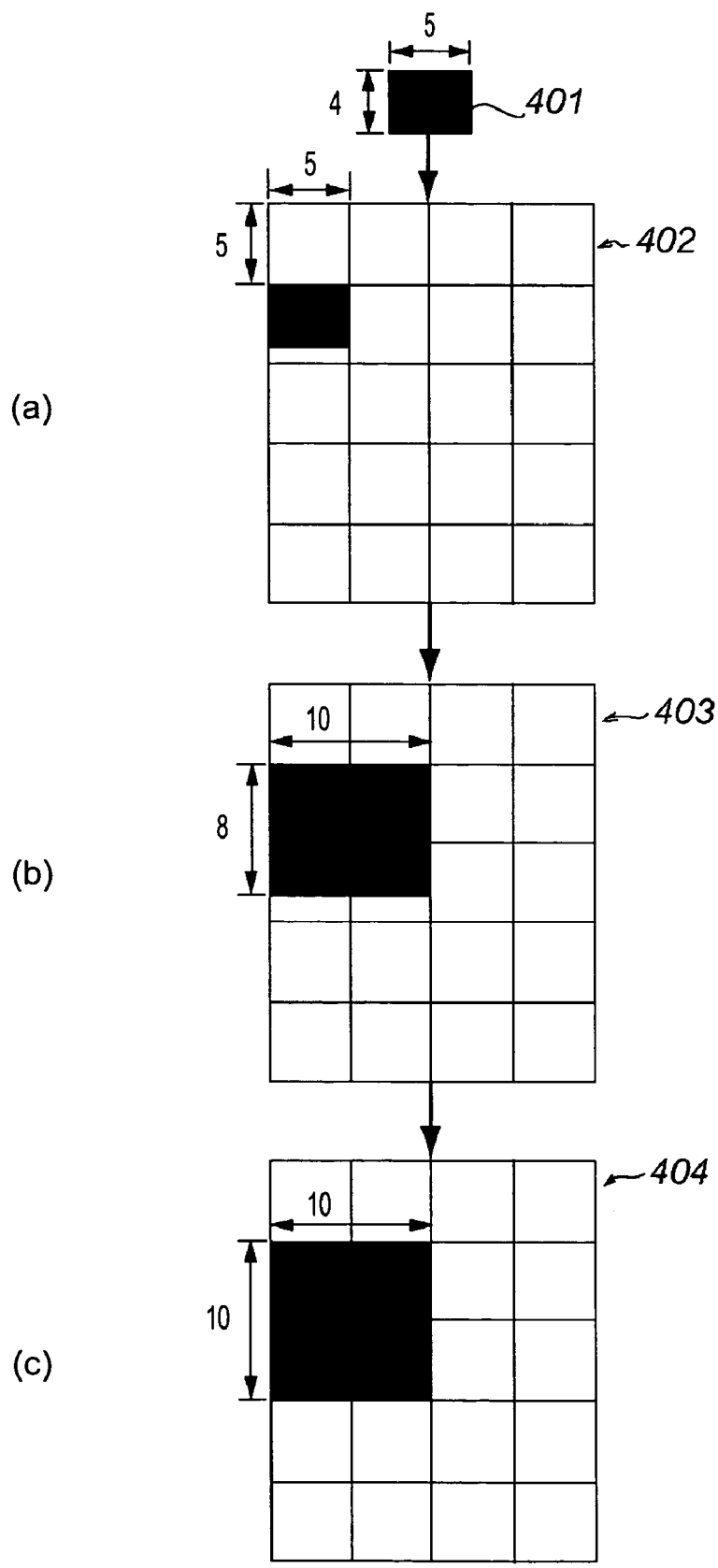
FIG. 4 visually illustrates an exemplary enlarging operation of an actual rectangular area and a grid operation on the rectangular area, at an enlargement processing section for enlarging the rectangular area and at a grid processing section for subjecting the rectangular area to the grid operation.

FIG. 4 visually illustrates an enlarging operation of an actual rectangular area and a grid operation on the rectangular area, at an enlargement processing section 107 configured to enlarge the rectangular area and at a grid processing section 108 configured to subject the rectangular area to the grid operation. Reference numeral 401 denotes a rectangular area having a vertical size of 4 pixels and a horizontal size of 5 pixels. The rectangular area 401 is disposed in an area 402 having grids with one unit being 5 pixels (refer to state (a) in FIG. 4). From this state, the enlargement processing section 107 doubles the horizontal and vertical sizes of the rectangular area, that is, increases the horizontal size of the rectangular area to 10 pixels and the vertical size of the rectangular area to 8 pixels as indicated by reference numeral 403.

The enlargement processing section 107 enlarges the vertical and horizontal sizes of each rectangular area by an integral multiple (N=1, 2, 3, . . . ) within a range not allowing the area of each rectangular area to be greater than the area of the layout area, so that each rectangular area which is enlarged to the greatest degree possible is finally disposed in the layout area.

Here, the vertical size of 8 pixels of the enlarged rectangular area cannot be divided by one grid unit (5 pixels in this case). Therefore, as indicated by reference numeral 404 shown in state (c) in FIG. 4, the vertical size of 8 pixels is increased in the vertical direction to a size that can be divided by the one grid unit (that is, from 8 pixels to 10 pixels). This operation is called a grid operation. The grid processing section 108 performs the grid operation by increasing the vertical and horizontal sizes of each rectangular area so as to match the grid size.

Figure 5:
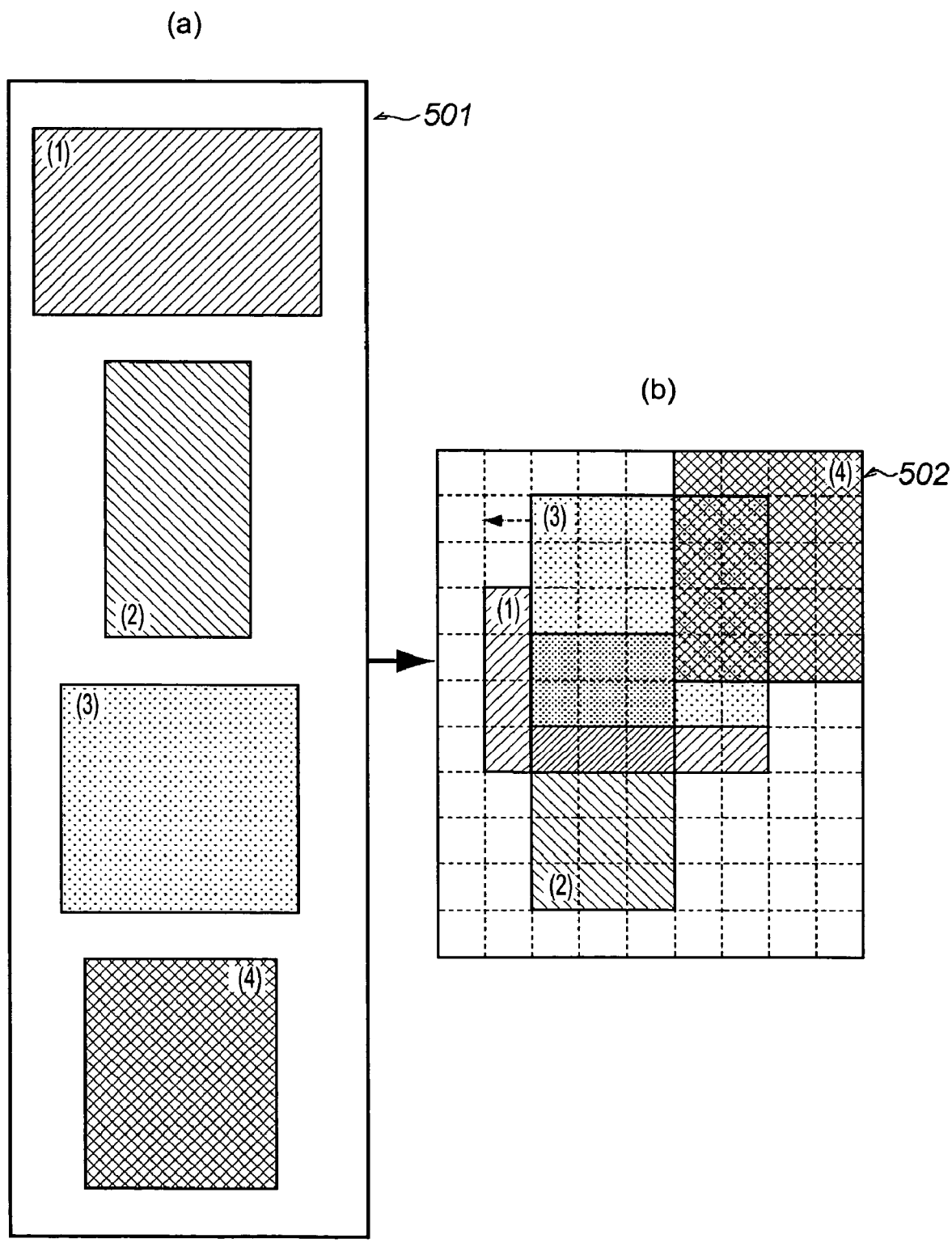
FIG. 5 visually illustrates an exemplary operation of disposing rectangular areas with a disposing processing section for randomly disposing the rectangular areas.

FIG. 5 visually illustrates an operation of actually disposing rectangular areas with the disposing processing section 109. Reference numeral 501 denotes a document including rectangular areas (1), (2), (3), and (4) which correspond to texts and images to be laid out and which have different vertical and horizontal sizes. As indicated by reference numeral 502 in state (b) in FIG. 5, these rectangular areas are randomly disposed so that each of the four corners of the rectangular areas fit in a corner of one grid square in a layout divided by the grids. Here, the rectangular areas may overlap each other.

When the overlap elimination processing section 110 determines that the rectangular areas overlap each other on the basis of information regarding their positions in the layout area, such as area positional coordinates, either one of the rectangular areas is moved to change its position so as to eliminate the overlap. Here, the overlap elimination processing section 110 executes the operations described below.

Figure 6:
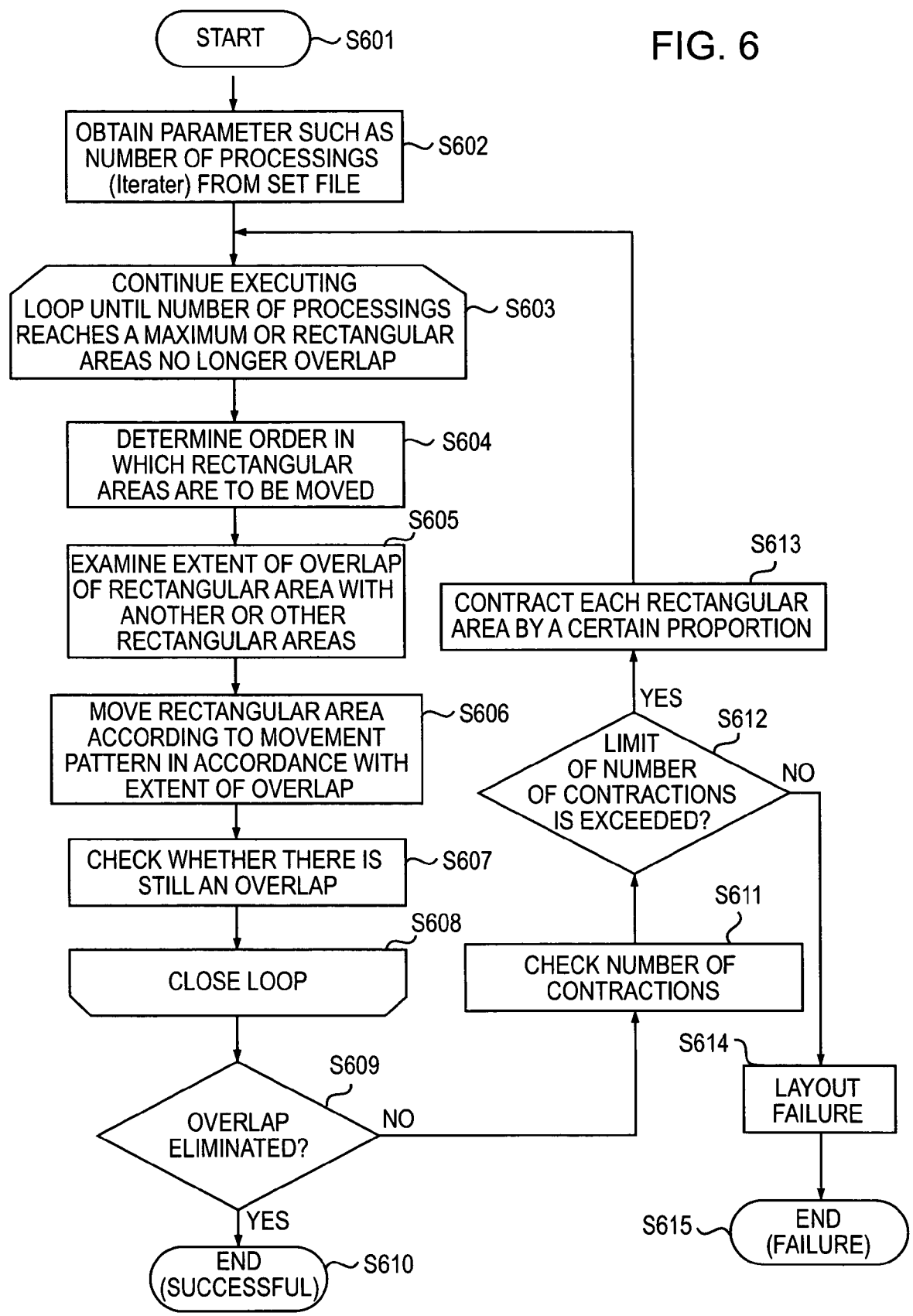
FIG. 6 is a flowchart illustrating exemplary operations carried out by an overlap elimination processing section.
Figure 7A:
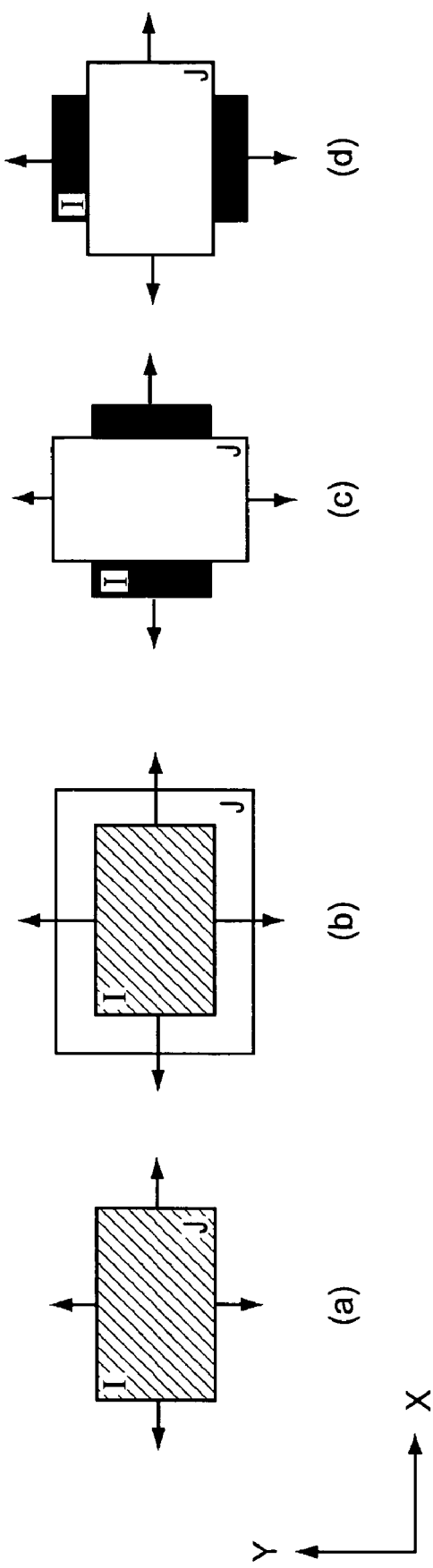
FIG. 7A illustrates an exemplary pattern of movement in accordance with the degree of overlap of rectangular areas.
Figure 7B:
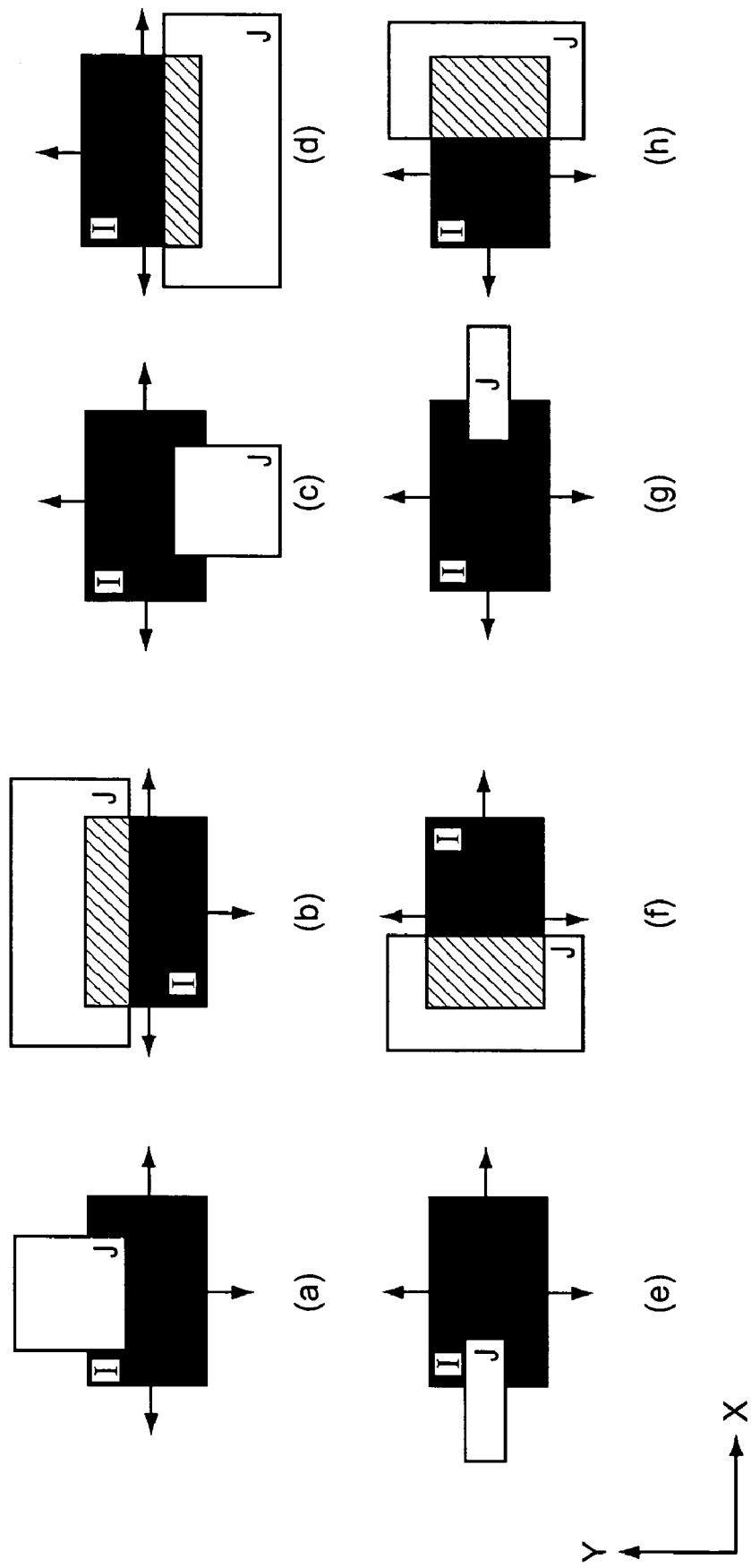
FIG. 7B illustrates another exemplary pattern of movement in accordance with the degree of overlap of the rectangular areas.
Figure 8:
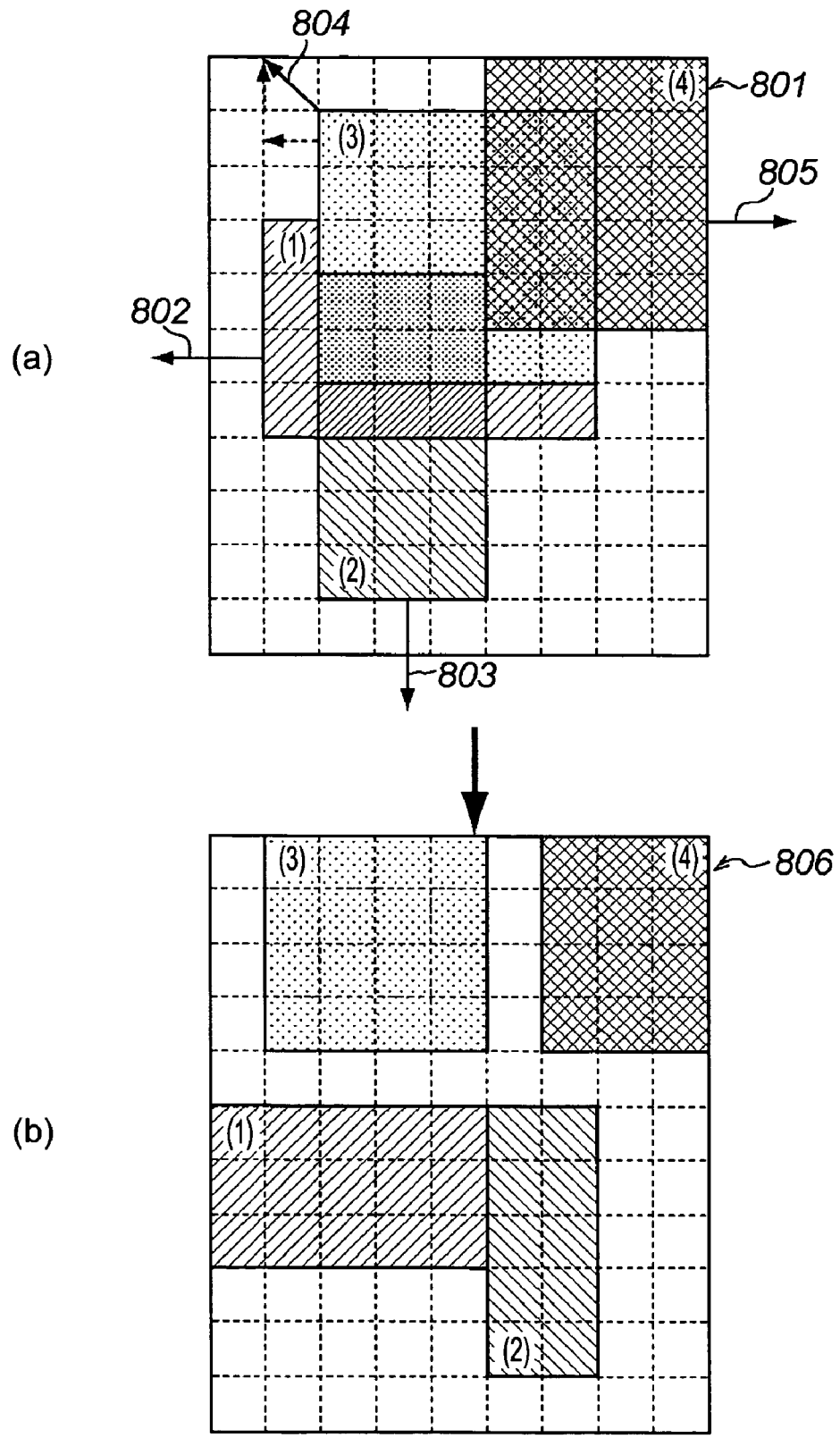
FIG. 8 illustrates an exemplary disposition of a plurality of rectangular areas and the elimination of overlaps of the rectangular areas.

FIG. 6 is a flowchart illustrating exemplary operations carried out by the overlap elimination processing section 110. FIGS. 7A to 7C illustrate exemplary patterns of movement in accordance with the degrees of overlaps of rectangular areas. FIG. 8 illustrates the elimination of overlaps of the rectangular areas, with the state of elimination of the overlaps being visually shown. The operations of the overlap elimination processing section 110 will hereunder be described with reference to these figures.

First, the elimination of the overlap of the rectangular areas is started in Step S601 shown in FIG. 6. Then, in Step S602, various items of set information for controlling the layout process, such as the set value of the number of times operations are repeated (that is, a maximum value (Max) of a parameter (Iterater) for controlling the number of times a loop is executed) and a set value of the number of times the rectangular areas are reduced, are obtained from the set file 105.

In Step S603, the overlap elimination loop is started. Until the parameter (Iterater) for controlling the repetition of the execution of the loop reaches the maximum value (Max), or until the overlap of the rectangular areas is eliminated, the operations to Step S608 are repeated.

In Step S604, the order in which the rectangular areas are moved (such as the rectangular areas (1) to (4) in the document 501 in state (a) in FIG. 5) is determined. In Step S605, in accordance with the order determined in Step S604, a state in which one rectangular area to be moved overlaps another or other rectangular areas is examined. In Step S606, the one rectangular area to be moved is moved in accordance with a movement pattern in correspondence with the degree of overlap.

In Step S607, after moving the one rectangular area to be moved, an examination is carried out to check whether or not there is still overlapping of the rectangular areas other than the one that has been moved. In Step S608, a determination is made as to whether or not the overlaps of the rectangular areas can be eliminated and the number of times the loop is executed exceeds the maximum value in order to eliminate the overlaps of the rectangular areas within the set number of repetitions. For example, after selecting the rectangular area (1) as the first rectangular area to be moved and eliminating the overlap of the rectangular area (1), a determination is successively made as to whether or not there are overlaps of the remaining rectangular areas (2) to (4). When there are overlaps, the rectangular areas that are selected as the rectangular areas to be moved are successively moved within the layout area, so that all the overlapped areas are eliminated.

When, in Step S609, a determination is made that the overlaps have been eliminated (Yes in Step S609), the process proceeds to Step S610 in order to end the overlap elimination operations.

In contrast, when, in Step S609, a determination is made that the overlaps have not been eliminated (No in Step S609), the process proceeds to Step S611. When the overlaps have not been eliminated (for example, the number of repetitions has been exceeded), the number of reductions is checked in Step S611. If, in Step S612, the number of reductions is not exceeded (Yes in Step S612), the process proceeds to Step S613 in order to reduce each rectangular area by a fixed proportion provided by the set file 105. Then, the process returns to Step S603 in order to eliminate the overlaps.

On the other hand, if the number of reductions is exceeded (No in Step S612), the process proceeds to Step S614 and makes a determination that the overlaps of the rectangular areas cannot be finally eliminated by the set number of reductions and the number of overlap elimination loops. As a result, in Step S614, the user is notified that the rectangular areas have not been successfully laid out.

FIGS. 7A to 7C illustrate patterns of overlaps of rectangular areas and patterns of movement of the rectangular area to be moved (here, a rectangular area (I)) horizontally and vertically (in 4, 3, and 2 directions, respectively). Here, the rectangular area (I) to be moved is colored black, and the rectangular area which overlaps or is overlapped by the rectangular area (I) corresponds to a rectangular area (J) and is white. When the rectangular area (I) overlaps the top side of the rectangular area (J), the area of overlap is shown by a hatched portion in FIGS. 7A to 7C. An overlap condition defines in what way the rectangular area (J) overlaps any one of the four sides of the rectangular area (I) to be moved.

In FIG. 7A, state (a) is a state in which the rectangular area (I) and the rectangular area (J) having the same size overlap each other; state (b) is a state in which the rectangular area (I) overlaps the rectangular area (J) having an overall larger size than the rectangular area (I); state (c) is a state in which the rectangular area (J) having a larger vertical size in the Y direction overlaps the rectangular area (I); and state (d) is a state in which the rectangular area (J) having a larger horizontal size in the X direction overlaps the rectangular area (I).

In these overlapping patterns, the rectangular area (I) is moved in any one of the vertical and horizontal directions (X-Y directions or directions of the arrows in FIG. 7A). The overlap elimination processing section 110 randomly determines in which of the four directions the rectangular area (I) is to be moved.

In the movement pattern shown in FIG. 7A, the rectangular area (I) can move in any of the two horizontal and two vertical directions. The movement pattern shown in FIG. 7B indicate the overlap conditions when the rectangular area (I) to be moved moves in three directions.

In FIG. 7B, state (a) is a state in which the rectangular area (J) having a smaller horizontal size (in the X direction) than the rectangular area (I) overlaps the rectangular area (I); state (b) is a state in which the rectangular area (I) overlaps the rectangular area (J) having a larger horizontal size (in the X direction) than the rectangular area (I); state (c) is a state in which the rectangular area (J) having a smaller horizontal size (in the X direction) than the rectangular area (I) overlaps the rectangular area (I); state (d) is a state in which the rectangular area (I) overlaps the rectangular area (J) having a larger horizontal size (in the X direction) than the rectangular area (I); state (e) is a state in which the rectangular area (J) having a smaller vertical size (in the Y direction) than the rectangular area (I) overlaps the left side of the rectangular area (I); state (f) is a state in which the rectangular area (J) having a larger vertical size (in the Y direction) than the rectangular area (I) overlaps the left side of the rectangular area (I); state (g) is a state in which the rectangular area (J) having a smaller vertical size (in the Y direction) than the rectangular area (I) overlaps the right side of the rectangular area (I); and state (h) is a state in which the rectangular area (J) having a larger vertical size (in the Y direction) than the rectangular area (I) overlaps the right side of the rectangular area (I).

In these overlapping patterns, the rectangular area (I) is moved in any one of the three directions indicated by the arrows in FIG. 7B. The overlap elimination processing section 110 randomly determines in which of the three directions the rectangular area (I) is to be moved.

In the movement pattern shown in FIG. 7A, the rectangular area (I) can move in any one of the two vertical directions and two horizontal directions, and, in the movement pattern shown in FIG. 7B, the rectangular area (I) can move in any one of the three directions. In contrast, a movement pattern shown in FIG. 7C indicates the overlap conditions when the rectangular area (I) to be moved moves in two directions.

In FIG. 7C, state (a) is a state in which a vertical side 716*a* and a horizontal side 716*b* of the rectangular area (I) overlap the rectangular area (J); state (b) is a state in which a vertical side 717*a* and a horizontal side 717*b* of the rectangular area (I) overlap the rectangular area (J); state (c) is a state in which a vertical side 718*a* and a horizontal side 718*b* of the rectangular area (I) overlap the rectangular area (J); and state (d) is a state in which a vertical side 719*a* and a horizontal side 719*b* of the rectangular area (I) overlap the rectangular area (J).

In these overlapping patterns, the rectangular area (I) moves in either of the two directions indicated by the arrows in FIG. 7C. The overlap elimination processing section 110 (see FIG. 1B) randomly determines in which of the two directions the rectangular area (I) is to be moved. The overlap elimination processing section 110 can move the rectangular area to be moved in accordance with the movement patterns shown in FIGS. 7A to 7C in correspondence with the degree of overlap of the rectangular areas in order to eliminate the overlapped area while moving the rectangular area by a combination of the movement patterns.

FIG. 8 illustrates the disposition of a plurality of rectangular areas and the elimination of overlaps of the rectangular areas. In state (a) shown in FIG. 8, reference numeral 801 denotes the disposition of the plurality of rectangular areas that the disposing processing section 109 has disposed in a layout area. By moving the overlapped rectangular areas (1) to (4) in the directions of arrows 802 to 805 and by reducing the rectangular areas (1) to (4) by one grid in the horizontal and vertical directions, the overlaps are finally eliminated in the disposition of the rectangular areas as indicated by reference numeral 806 in state (b) shown in FIG. 8.

Next, an exemplary layout process executed by an optimization algorithm method in the layout processing section 112 will be described with reference to FIGS. 9, 10, and 11. The layout processing section 112 may use a simulated annealing method (hereunder referred to as the "SA method") as the optimization algorithm method. The SA method, which will not be described in detail below, is a method of overcoming the problem of combination optimization.

With the SA method, for example, the temperature of a solid is set high until the solid possesses a sufficient amount of free energy, and then, while reducing the temperature while controlling it, the amount of free energy is minimized by a certain procedure. When a certain solid S is set in a current state $S_i$, the solid S is assumed to possess energy $E_i$. By randomly selecting particles and moving the particles by a randomly set amount, a following state $S_j$ in which the solid S possesses energy $E_j$ is produced. If the energy in the current state is less than the energy in the following state, that is, when $\Delta E = E_i - E_j \leq 0 \ldots$ (1), a movement for this case is selected, so that the state $S_j$ becomes the current state.

In contrast, if the energy in the current state is greater than the energy in the following state, that is, when $\Delta E = E_i - E_j > 0$, whether or not the solid S is to be moved is determined by probability on the basis of the following Formula (3):

$$\text{Prob} = e^{-(\Delta E/(KB \cdot T))} \quad (3)$$

where KB is the Boltzmann's constant and T is the temperature.

Here, the standard of determining whether or not to move the solid S is known as a metropolis algorithm based on a large number of repetitions. The solution through the entire process is called the SA method. In the layout process in the embodiment, the layout processing section 112 uses a similar method to control the layout of the rectangular areas.

Figure 9:
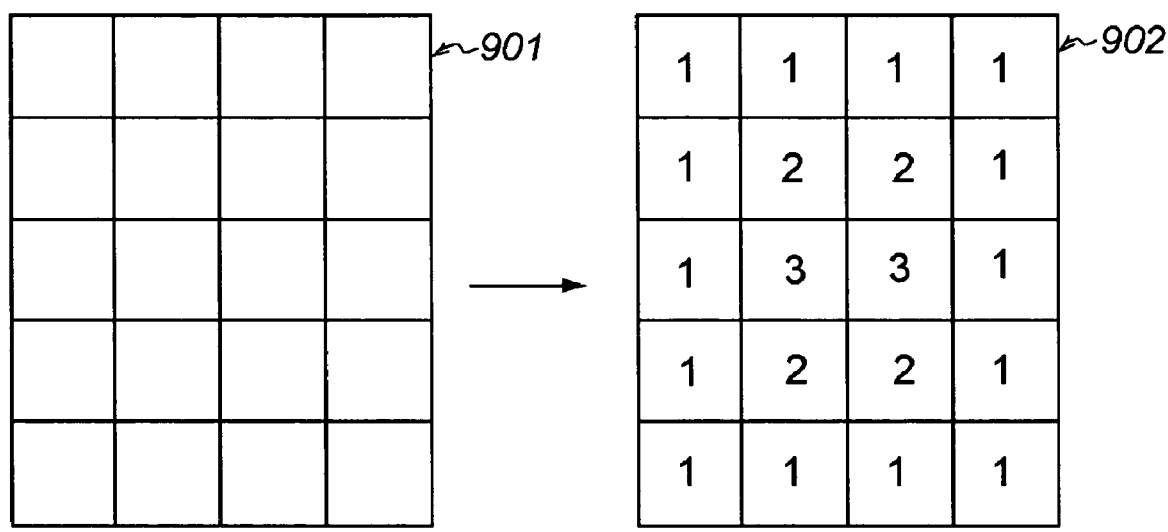
FIG. 9 shows a specific example of a weight template indicating the directionality of a layout.

FIG. 9 shows a specific example of the weight template 106 (shown in FIG. 1B) indicating the directionality of a layout. In FIG. 9, reference numeral 901 denotes a layout area divided by grids, and reference numeral 902 denotes a state in which weight numbers (evaluation values) are added to respective grid squares in the weight template. The evaluation value is such that 1 point corresponds to 10. Rectangles tend to gather where the evaluation values are large (3 is the largest in this case), so that the directionality of the layout is towards the center. The directionality of the layout can be changed by the distribution of the evaluation values, so that the directionality of the layout of the rectangular areas may be, for example, towards the right or towards the left in addition to towards the center. In the embodiment, the directionality of the layout is towards the center.

Figure 10:
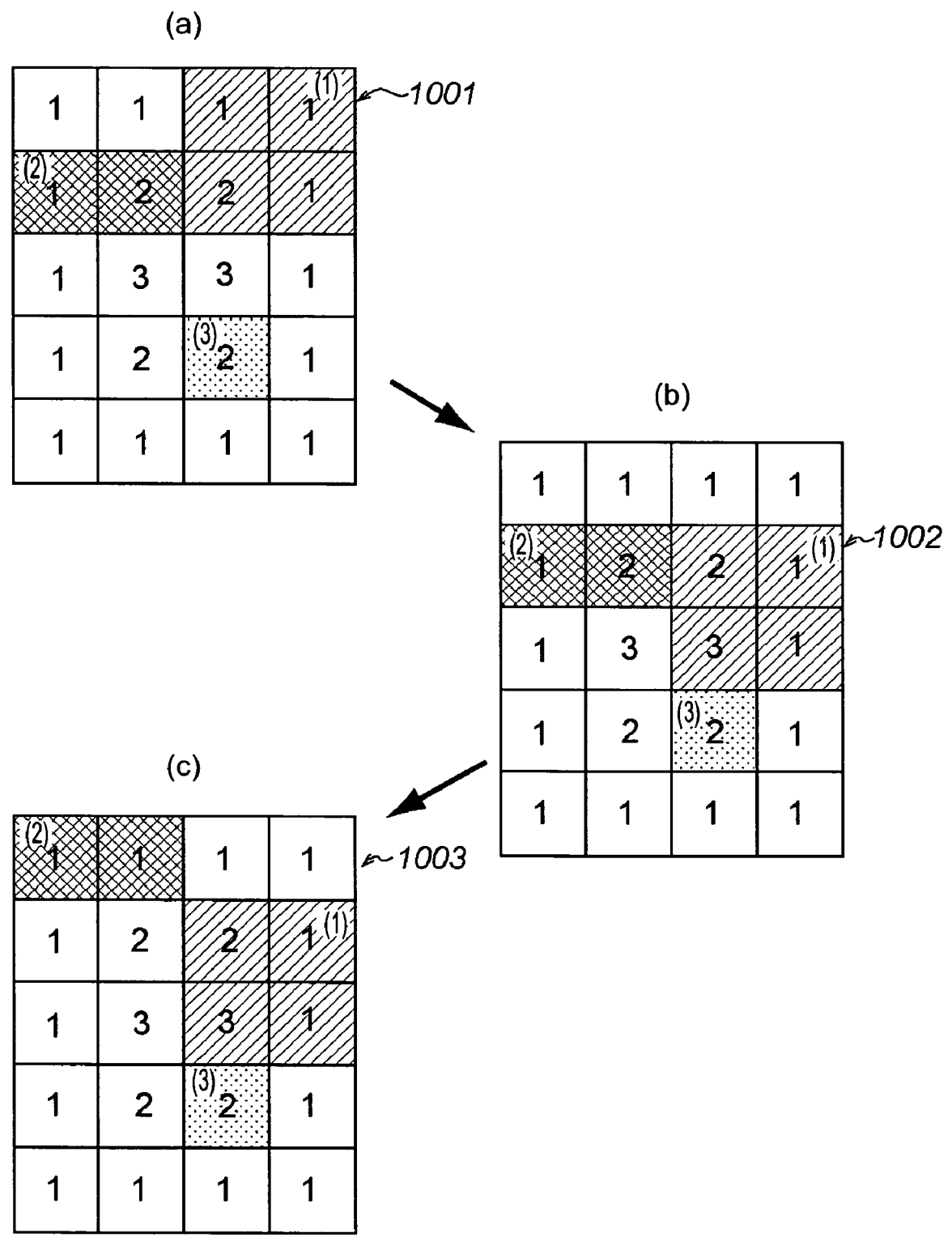

FIG. 10 schematically illustrates how the layout is carried out by combining the weight template indicating the directionality of the layout and the SA method. In FIG. 10, as indicated by reference numeral 1001 in state (a), grids where rectangular areas (1) to (3) are disposed are provided on a layout area, with the sum of the weight numbers allocated to the grids where the rectangular areas are disposed being handled as the evaluation value.

Here, the rectangular areas are such that:

$$\text{rectangular area (1): } 1+1+2+1=5 \quad (4)$$

$$\text{rectangular area (2): } 1+2=3 \quad (5), \text{ and}$$

$$\text{rectangular area (3)} = 2 \quad (6).$$

In this case, the overall evaluation value of the rectangular areas is determined on the basis of the following Formula (7):

$$(5+3+2) \times 10 = 100 \quad (7)$$

In Formula (7), in order to handle the evaluation value 1 as 10 points, the sum of the evaluation values of Formulas (4) to (6) is multiplied by 10.

Next, the rectangular area (1) is moved in a random direction. When the rectangular areas (1) to (3) are disposed, for example, as indicated by reference numeral 1002 in state (b) in FIG. 10, the evaluation values are determined on the basis of the following Formulas (8) to (11):

$$\text{rectangular area (1): } 2+1+3+1=7 \quad (8)$$

$$\text{rectangular area (2): } 1+2=3 \quad (9)$$

$$\text{rectangular area (3): } 2 \quad (10)$$

In this case, the overall evaluation value of the rectangular areas is determined on the basis of the following Formula (11):

$$(7+3+2) \times 10 = 120 \quad (11)$$

Since the new evaluation value obtained in Formula (11) after the movement of the rectangular area (1) is greater than the evaluation value obtained in Formula (7), the value obtained in Formula (11) is used on the basis of the relationship in Formula (1). In other words, the position of the rectangular area (1) is used as the position that it has reached after moving (the position in the state (b) in FIG. 10 where the new evaluation value is obtained) and the rectangular area (1) is disposed there.

Next, the rectangular area (2) is moved in a random direction. When the rectangular areas (1) to (3) are disposed, for example, as indicated by reference numeral 1003 in state (c) in FIG. 10, the evaluation values are determined on the basis of the following Formulas (12) to (15):

$$\text{rectangular area (1): } 2+1+3+1=7 \quad (12)$$

$$\text{rectangular area (2): } 1+1=2 \quad (13)$$

$$\text{rectangular area (3): } 2 \quad (14)$$

In this case, the overall evaluation value of the rectangular areas is determined on the basis of the following Formula (15):

$$(7+2+2) \times 10 = 110 \quad (15)$$

The new evaluation value obtained in Formula (15) after the movement of the rectangular area (2) is less than the evaluation value obtained in Formula (11). Therefore, on the basis of the relationship in Formula (2), the layout processing section 112 makes a determination as to whether or not to move the rectangular area (2) by probability in accordance with Formula (3).

When the current temperature is 100° C., and the Boltzmann's constant is 1, the following hold:

$$\Delta E = E_i - E_j = 120 - 110 = 10 \quad (16)$$

$$\text{Prob} = e^{-(\Delta E/(KB \cdot T))} = 0.9048 \quad (17)$$

Independently of these calculations, a random numerical value is selected from the Boltzmann's constants of 0 to 1. If, for example, 0.6 is selected, 0.6<P (=0.9048), so that the position of the rectangular area (2) is used as the position that it has reached after moving (the position in the state (c) in FIG. 10 where the new evaluation value is obtained) and the rectangular area (2) is disposed there.

In contrast, when the numerical value that is randomly selected is 0.95, 0.95>P(=0.9048). The layout processing section 112 (from FIG. 1B) does not select movement of the rectangular area (2) by the method of determination by probability on the basis of Formula (3), so that the rectangular area (2) remains at the position in the state (b) in FIG. 10.

Here, it is desirable to previously determine the current temperature in relation to an evaluation value (10 points with respect to a numerical value 1) by a test so as not to be a temperature at which calculation results obtained by probability tend to become certain results. Although the aforementioned calculation is carried out with the temperature being 100° C., other parameter values may also be used.

The layout processing section 112 determines the overall layout evaluation value on the basis of the position of each rectangular area and the weight values, and disposes the rectangular areas at their optimal positions in accordance with the evaluation values (for example, the evaluation values (1) to (3)).

Figure 11:
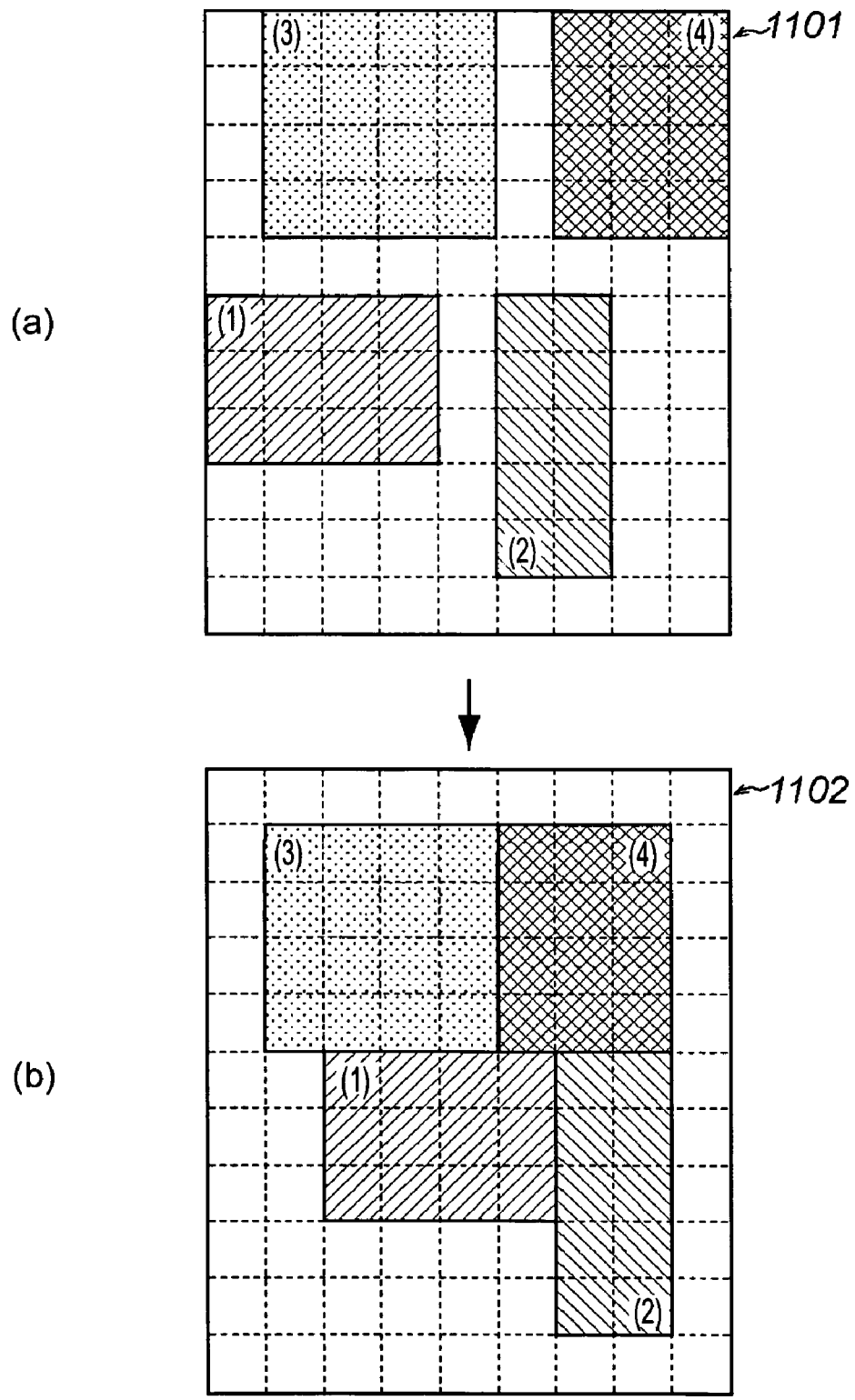
FIG. 11 illustrates exemplary layout operations carried out by the simulated annealing method when the rectangular areas do not overlap.

FIG. 11 illustrates exemplary layout operations carried out by the SA method when the rectangular areas do not overlap. In FIG. 11, reference numeral 1101 in state (a) denotes a case in which rectangular areas (1) to (4) are randomly disposed in a layout area with the disposing processing section 109, and reference numeral 1102 in state (b) denotes a result in which the rectangular areas (1) to (4) are laid out by the SA method with the layout processing section. The rectangular areas are laid out towards the center without any gaps.

In the state (a) in FIG. 11, the rectangular areas are randomly disposed in the layout area without any overlap of the rectangular areas. However, when there is an overlap or overlaps after the random disposition, by eliminating the overlap or overlaps with the overlap elimination processing section 110, the layout processing section 112 can carry out layout operations.

FIG. 12 illustrates an exemplary fine adjustment carried out by the fine adjustment processing section 113. In state (a) in FIG. 12, reference numeral 1201 denotes a result of layout by the SA method. At this point in time, the layout result is that in which each rectangular area has been subjected to a grid operation, with each rectangular area being enlarged or reduced in accordance with a grid width.

As indicated by reference numeral 1202 in state (b) in FIG. 12, the size of each rectangular area is returned to its size prior to the grid operation, that is, the size in which the aspect ratio of the original rectangular area is maintained. This causes gaps to be produced between the rectangular areas.

In order to eliminate these gaps, the following operations are carried out. As indicated by reference numeral 1203 in state (c) in FIG. 12, the distances between the center (indicated by reference numeral 1204 in state (c) in FIG. 12) of the layout area and the centers (indicated by reference numerals 1205 to 1208) of the rectangular areas are determined. Hereunder, the rectangular areas are moved from the rectangular area that is closest to the center 1204. First, a rectangular area (here, a rectangular area (1)) whose center is closest to the center 1204 of the layout area is moved towards a rectangular area (3) that is closest to the rectangular area (1) as indicated by an arrow 1209 in the state (c) in FIG. 12 until the rectangular area (1) comes into contact with a horizontal side 1220 of the rectangular area (3).

Similarly, the rectangular area (3) is moved towards a vertical side 1222 of a rectangular area (4) that is closest to the rectangular area (3). A horizontal side 1221 of the rectangular area (4) is already in contact with the rectangular area (1), and the vertical side 1222 of the rectangular area (4) is in contact with the rectangular area (3), so that the rectangular area (4) cannot be moved. Therefore, the fine adjustment processing section 113 finally moves a rectangular area (2) that is furthest from the center 1204 until the rectangular area (2) comes into contact with a vertical side 1223 of the rectangular area (1) and the horizontal side 1221 of the rectangular area (4). By this, as indicated by reference numeral 1210 in state (d) in FIG. 12, a result in which the rectangular areas are laid out without gaps between them is obtained.

By successively carrying out the aforementioned operations, a layout controlling operation for automatically disposing the plurality of rectangular areas in the layout area can be carried out.

According to the aforedescribed embodiment, with items of contents data regarding, for example, an image and a text that are included in a document being considered as being disposed in one rectangular area, the rectangular areas can be optimally laid out in a certain layout area. Therefore, it becomes unnecessary to perform human operations that must be determined while considering the layout, so that costs can be reduced. If it is also possible to obtain a completely random layout result, the directionality of the layout can be determined to a certain extent by the weighting, so that various layout results can be flexibly obtained. From this, the embodiment may be applied to, for example, editing and automatically scrap handling a document in which text and image data are included, such as newspapers.

Thus, according to the aforementioned embodiment, with regard to content data, for example, an image and text that that are included in a document being considered as being disposed in one rectangular area, the rectangular areas can be automatically disposed in the document in accordance with the sizes of the rectangular areas corresponding to the content data Alternative Exemplary Embodiment In the foregoing description, the layout controlling device 100 can perform, for example, grid operations, disposing operations, overlap eliminations, layout operations, and fine adjustments on the rectangular areas with their sizes remaining the same, that is, without enlarging the rectangular areas. In this case, the layout controlling device 100 allows the process to proceed from the Step S104 of reading the set file and the weight template in FIG. 1C to the Step S108 of performing the grid operation on the rectangular areas. When the grid operation step (Step S108) is not carried out, it becomes unnecessary to return the sizes of the rectangular areas to those prior to the enlargement in the fine adjustment step (Step S113).

Other Exemplary Embodiments

The present invention is also achieved by supplying a storage medium having a software program code stored thereon for realizing the functions of the above-described embodiment to the layout controlling device and by reading and executing the program code, stored on the storage medium, with the processor unit 133 of the device and a computer (CPU or MPU). The storage of the program code is not limited to storage in a client computer, so that it may stored in, for example, a computer functioning as a server. Here, the program code itself read out from the storage medium executes the functions of the above-described embodiment, so that the present invention comprises the storage medium storing the program code.

The storage medium for supplying the program code may be, for example, a flexible disc, a hard disc, an optical disc, a magnetic-optical disc, CD-ROM, CD-R, DVD, a magnetic tape, a nonvolatile memory card, ROM, or the like.

By executing the program code read out by the computer, not only are the functions of the above-described embodiment achieved, but also some or all of the actual operations are carried out on the basis of an instruction of the program code with, for example, an operating system (OS) operating at the computer in order to thereby achieve the functions of the aforementioned embodiment.

In addition, after the program code read out from the storage medium has been written onto a memory of a feature expansion unit connected to a computer or a feature expansion board inserted in the computer, some or all of the actual operations are carried out on the basis of an instruction of the program code with, for example, a CPU in the feature expansion board or the feature expansion unit in order to thereby achieve the functions of the embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-340805 filed Nov. 25, 2004, which is hereby incorporated by reference herein in its entirety.

What is claimed is:

1. A method, performed by a layout apparatus having a processor, of laying out a plurality of contents on a layout area divided into a plurality of divided areas in accordance with sizes of rectangle areas where the contents are set, the method comprising:
a first arranging step, preformed by the processor, of enlarging, in a vertical direction and a horizontal direction by one divided area, each of the rectangle areas where the plurality of contents are set, and arranging the enlarged rectangle areas on the divided areas;
a first moving step, preformed by the processor, of moving one of the enlarged rectangle areas by one divided area to remove an overlap with another one of the enlarged rectangle areas in a case where the one of the enlarged rectangle areas overlaps with the another one of the enlarged rectangle areas;
a second moving step, preformed by the processor, of moving, by one divided area, the enlarged rectangle areas moved in the first moving step, in accordance with weight information allocated to the divided areas; and
a second arranging step, preformed by the processor, of reducing, in the vertical direction and the horizontal direction, each of the enlarged rectangle areas moved in the first and second moving steps in accordance with an aspect ratio of each of the rectangle areas before enlarging and arranging the reduced rectangle areas to remove gaps which are made between the reduced rectangle areas by reducing the rectangle areas.

2. The method according to claim 1, wherein the first moving step includes moving the one of the enlarged rectangle areas in a direction in accordance with an overlapping degree of the plurality of contents.

3. The method according to claim 1, wherein the second moving step includes moving the enlarged rectangle areas in accordance with the weight information allocated to the divided areas where the enlarged rectangle areas are arranged.

4. A computer readable medium containing computer-executable instructions for laying out a plurality of contents on a layout area divided into a plurality of divided areas in accordance with sizes of rectangle areas where the contents are set, the computer readable medium comprising:
computer-executable instructions for a first arranging of enlarging, in a vertical direction and a horizontal direction by one divided area, each of the rectangle areas where the plurality of contents are set and arranging the enlarged rectangle areas on the divided areas ;
computer-executable instructions for a first moving of one of the enlarged rectangle areas by one divided area to remove overlap with another one of the enlarged rectangle areas in a case where the one of the enlarged rectangle areas overlaps with the another one of the enlarged rectangle areas;
computer-executable instructions for a second moving of the enlarged rectangle areas moved in the first moving, by one divided area, in accordance with weight information allocated to the divided areas; and
computer-executable instructions for a second arranging of reducing, in the vertical direction and the horizontal direction, each of the enlarged rectangle areas moved in the first and second moving in accordance with an aspect ratio of each of the rectangle areas before enlarging and arranging the reduced rectangle areas to remove gaps which are made between the reduced rectangle areas by reducing the rectangle areas.

5. The computer readable medium according to claim 4, wherein the first moving includes moving the one of the enlarged rectangle areas in a direction in accordance with an overlapping degree of the plurality of contents.

6. The computer readable medium according to claim 4, wherein the second moving includes moving the enlarged rectangle areas in accordance with the weight information allocated to the divided areas where the enlarged rectangle areas are arranged.

7. A layout apparatus for laying out a plurality of contents on a layout area divided into a plurality of divided areas in accordance with sizes of rectangle areas where the contents are set, the layout apparatus comprising:
a processor including:
a first arranging unit configured to instruct the processor to enlarge, in a vertical direction and a horizontal direction by one divided area, each of the rectangle areas where the plurality of contents are set and to arrange the enlarged rectangle areas on the divided areas;
a first moving unit configured to instruct the processor to move one of the enlarged rectangle areas by one divided area to remove overlap with another one of the enlarged rectangle areas in a case where the one of the enlarged rectangle areas overlaps with the another one of the enlarged rectangle areas;
a second moving unit configured to instruct the processor to move, by one divided area, the enlarged rectangle areas moved by the first moving unit, in accordance with weight information allocated to the divided areas; and
a second arranging unit configured to instruct the processor to reduce, in the vertical direction and the horizontal direction, each of the enlarged rectangle areas moved by the first and second moving units in accordance with an aspect ratio of each of the rectangle areas before enlarging and arrange the reduced rectangle areas to remove gaps which are made between the reduced rectangle areas by reducing the rectangle areas.

8. The layout apparatus according to claim 7, wherein the first moving unit moves the one of the enlarged rectangle areas in a direction in accordance with an overlapping degree of the plurality of contents.

9. The layout apparatus according to claim 7, wherein the second moving unit moves the enlarged rectangle areas in accordance with the weight information allocated to the divided areas where the enlarged rectangle areas are arranged.

* * * * *